United States Patent [19]

Garrett

[11] 4,146,292
[45] Mar. 27, 1979

[54] TELEPHONE WALL MOUNTING
[75] Inventor: Brian D. Garrett, Hurst, Tex.
[73] Assignee: Superior Cable Corporation, Hickory, N.C.
[21] Appl. No.: 888,624
[22] Filed: Mar. 21, 1978
[51] Int. Cl.² ............................................. H02B 1/06
[52] U.S. Cl. ............................ 339/125 R; 339/176 M
[58] Field of Search ............ 339/91 R, 176 M, 119 R, 339/125 R, 126 R

[56] References Cited
U.S. PATENT DOCUMENTS

| | | |
|---|---|---|
| 3,850,497 | 11/1974 | Krumreich et al. ......... 339/176 M X |
| 3,990,764 | 11/1976 | Krumreich ...................... 339/176 M |
| 4,040,699 | 8/1977 | Rasmussen ......................... 339/91 R |
| 4,071,696 | 1/1978 | Anderson ...................... 339/91 R X |

Primary Examiner—Roy Lake
Assistant Examiner—E. F. Desmond
Attorney, Agent, or Firm—Roy B. Moffitt

[57] ABSTRACT

Disclosed is a telephone wall mounting adapted to receive a mating plug used in the installation of a wall telephone connected to a telephone transmission line, such mounting comprising: a base plate having a centrally located hole, rectangular in shape, having first and second opposing sidewalls each containing an aligned slot and a third sidewall containing a plurality of parallel grooves adapted to receive a like number of spring contacts; two nail head like studs, each having a shank portion one terminal portion of which is integrally connected to a nail head portion and the other terminal portion being in mechanical connection with and extending above the surface of the base plate, the nail head like portions being positioned parallel to the base plate; a rectangular jack housing including four sidewalls circumscribing the centrally located hole integral with and extending perpendicular from the base plate and terminating above the terminal edges of the nail head like portions of the nail head like studs, two opposing sidewalls of the jack housing each containing a slot in alignment with the aligned slots in the first and second opposing sidewalls of the centrally located hole; and, a protrusion integral with the base plate vertically extending therefrom in alignment with and adjacent to the last mentioned slots.

6 Claims, 10 Drawing Figures

TELEPHONE WALL MOUNTING

FIELD OF INVENTION

This invention relates to the field of telephone wall jack mountings. In particular, this invention is concerned with a wall mounting containing a jack, adapted to be in electrical communication with a pair of telephone transmission lines and to receive a plug, which is in electrical communication with a telephone subset, and providing nail head like support means for removably attaching the telephone subset to it. Specifically, the wall mounting of the instant invention concerns itself with electrical connections having multiple contacts.

BACKGROUND OF THE INVENTION

The direction of telephone technology today is towards the "modular apparatus" concept. As applied to telephone apparatus normally seen and used by a telephone subscriber, such involves telephone subsets, cords, and wall receptacles, which can be simply and easily plugged into one another to form an electrical connection with a telephone transmission pair, easily removed and moved to another location and reconnected to the same or to another telephone transmission pair all without the aid or necessity of skilled telephone repairman. So called modular jacks and plugs are described in U.S. Pat. No. 3,990,764 as well as U.S. Pat. No. 3,850,497, the disclosure of both of these patents incorporated by reference as if they were faithfully reproduced herein.

DESCRIPTION OF PRIOR ART

Prior art relating to the wall mountings contemplated by the instant invention is exemplified by FIG. 1 of U.S. Pat. No. 3,990,764. In such a disclosure, a two-part wall mounting assembly is shown with nail head like studs for removably attaching the telephone to the assembly, such studs being firmly affixed to a cover rather than a base plate itself, as is the case with the instant invention.

SUMMARY OF THE INVENTION

Disclosed is a telephone wall mounting adapted to receive a mating plug used in the installation of a wall mounted telephone subset connected to a telephone transmission line, such mounting comprising: a base plate having a centrally located rectangular shaped hole in it, the hole having first and second opposing sidewalls each containing a plurality of parallel slots adapted to receive a like number of spring contacts; two nail head like studs each having a shank portion, one terminal portion of which is integrally connected to a nail head portion and the other terminal portion being in mechanical connection with and extending above the surface of the base plate, the nail head like portions being in a position parallel to the base plate and in a common plane with the one another; a jack housing including sidewalls circumscribing the centrally located hole, integral with and extending perpendicular from the base plate and terminating above the terminal edges of the nail head like portions of the nail head like studs, the first and second opposing sidewalls of the jack housing each containing slots in alignment with the aligned slots in the opposing sidewalls of the hole in the base plate; and, a protrusion integral with the base plate vertically extending therefrom in alignment with and adjacent to the last mentioned slots.

The object of this invention, in addition to that as above summarized, is to provide a telephone wall jack mounting that is more sturdy (higher strength) than prior art structures, attachable to either a wall or to a receptacle in a wall and thereby provide a support for a telephone handset superior in strength to prior art to structures; and, to provide a jack housing for receiving a unitary dielectric contact carrier in a sturdy, positive, easily removable seat.

DETAILED DESCRIPTION OF INVENTION

Figure 1:
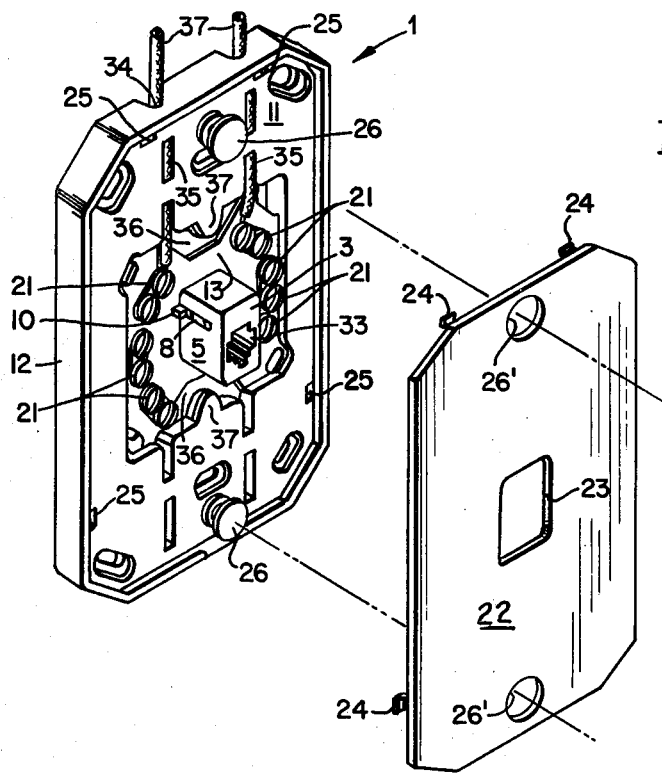
FIG. 1 is an exploded perspective view of the wall mounting of the instant invention and wall telephone base mounting adapted to mate therewith, the wall mounting incorporating a jack.
Figure 2:
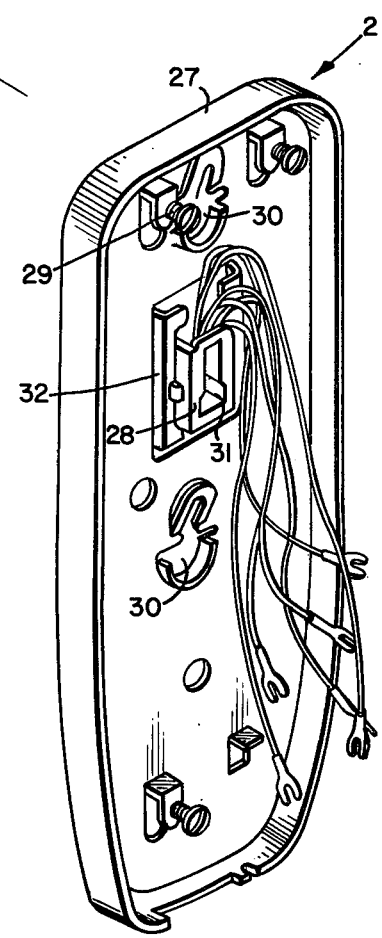
FIG. 2 is an exploded perspective view of the wall mounting in FIG. 1, showing it may be mounted directly to a wall without the aid of mounting brackets or receptacles as shown in FIGS. 3 and 4.
Figure 2:
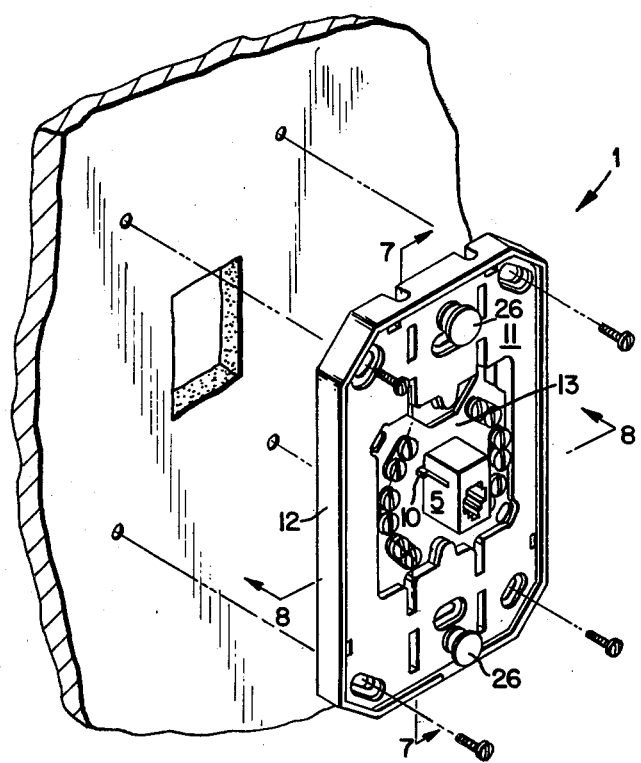
Figure 3:
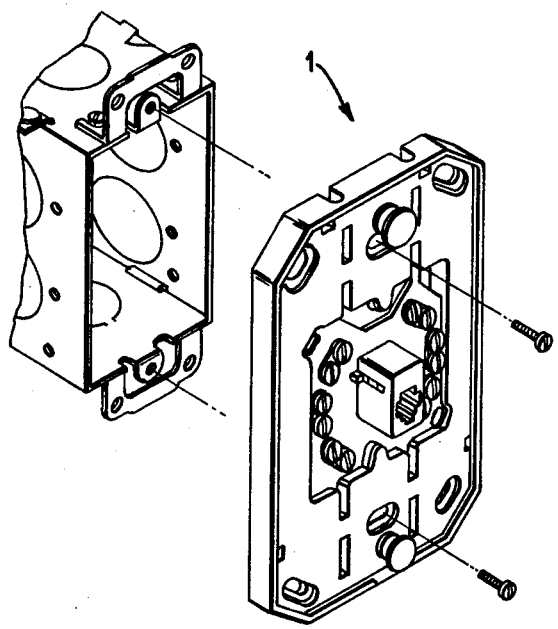
FIGS. 3 and 4 are exploded perspective views of the wall mounting in FIG. 1 showing how such may be connected to different embodiments of wall receptacles or brackets.

Referring to FIG. 1 in the drawings, there is shown an arrangement for providing a plug-in installation of a wall telephone set (telephone set not shown). The arrangement includes a wall mounting 1 and cover 22, the wall mounting adapted to be secured directly to a wall (see FIG. 2) or to a receptacle or wall bracket embedded in the wall, see FIGS. 3 and 4, and to the base 2 of a telephone wallset (not shown). Wall mounting 1 includes electrical socket 3, referred to in this description as a jack housing. A portion of jack housing 3 is adapted to receive a unitary dielectric contact carrier 4 (see FIGS. 5 and 6) and is comprised of sidewalls 5 circumscribing a configurated cavity 33 centrally located in base plate 11 in alignment with hole 14 (see FIG. 6). The remaining portion of jack housing 3 is adapted to receive plug 28 as described more fully in this specification. Unitary dielectric contact carrier 4 and plug 28 are removably fixed in jack housing 3 as hereinafter described.

Figure 8:
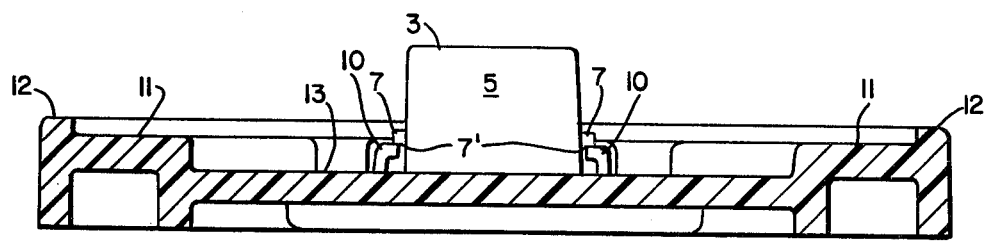
FIG. 8 is a cross section of wall mounting 1 along line 8—8 of FIG. 2.

Carrier 4 (see FIG. 5) is generally box-like shaped except that it has tongues 6 extending laterally from two of its opposing sidewalls. Each tongue 6 has a raised middle portion 7, which acts not only as a stop, but also as a locking means to lock carrier 4 into position within slots 8 provided for it formed in the sidewalls of jack housing 3. Two of the jack housing opposing sidewalls 5 have vertically disposed slots 8 adapted to receive and receiving in a snugly fitting relationship, tongues 6 and raised portions 7. Integrally attached to base plate 11 in depression 13 and disposed adjacent to slots 8 are flexible protrusions 10. When dielectric carrier means 4 is inserted into a portion of cavity 33 circumscribed by jack housing sidewalls 5 and hole 14 in base plate 11 (see FIG. 6), tongues 6 engage themselves into slots 8 and 16, (see FIGS. 5 and 6) and the dielectric carrier 4 slides into cavity 33 until the raised middle portions 7 override flexible protrusions 10 and thereby become removably locked into its desired received position, see FIG. 8. In such a position, protrusions 10 abut against the undermost shoulder 7' created by the raised middle portion 7 thereby performing the locking effect, in combination with tongues 6 slidably engaged in slots 8 and 16.

Figure 10:
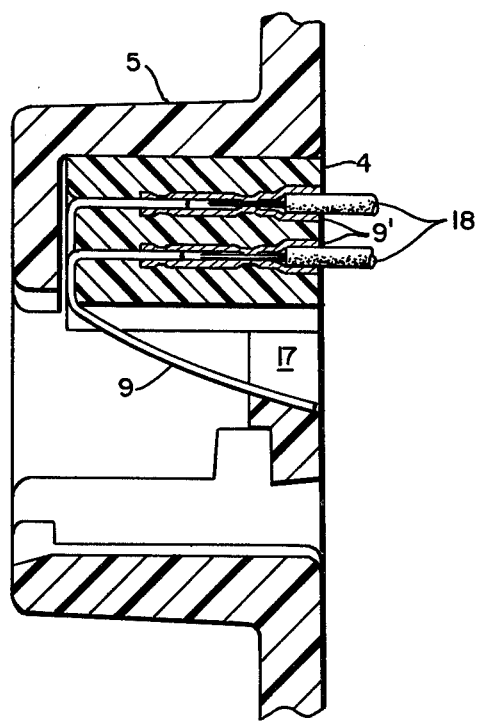
FIG. 10 is a cross section of jack housing 3 and dielectric carrier 4 nested inside of it along line 10—10 of FIG. 9.

Carrier 4 also has a plurality of orifices (see FIGS. 6 and 10) containing contact assemblies (9') in electrical connection with spring contacts 9, which are embedded in the body of carrier 4. Such orifices, contact assembly and spring contacts are the same as that disclosed in U.S. Pat. Nos. 3,990,764 and 3,850,497 to which specific reference is made for further details.

Figure 5:
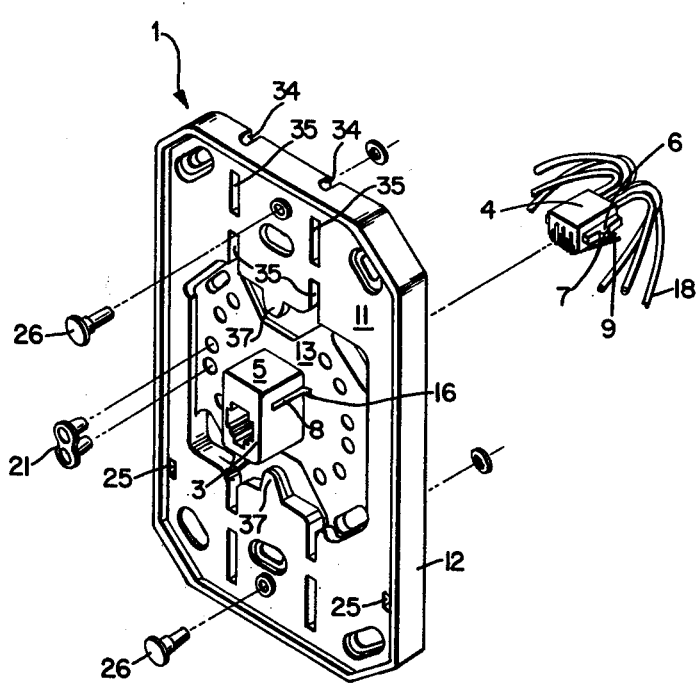
FIG. 5 is an exploded perspective view of the wall mounting showing the mating relationship of the jack housing 3, wall mounting 1 and a rectilinear shaped unitary dielectric contact carrier 4 with laterally extending tongue means 6 adapted to be engaged in slots 8 formed in two of the sidewalls forming the jack housing.
Figure 9:
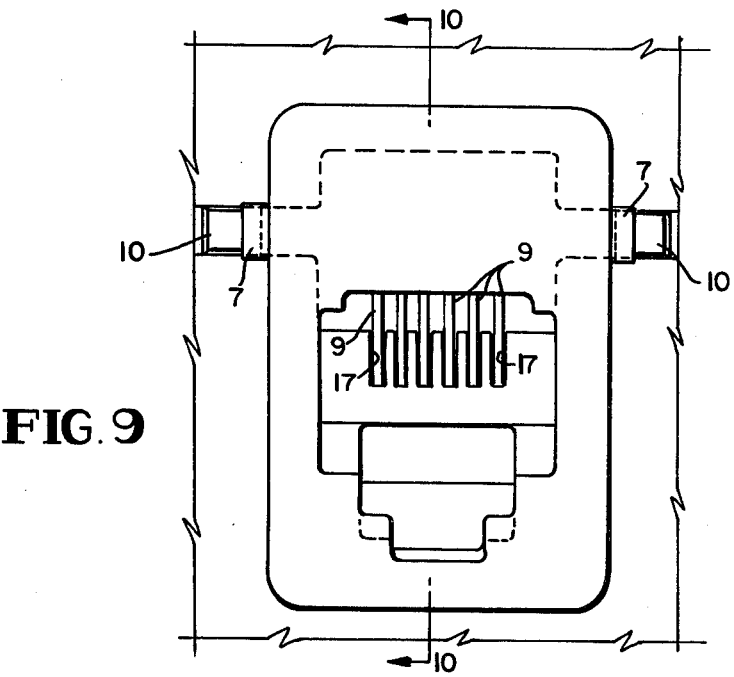
FIG. 9 is a plan view of jack housing 3 of FIG. 1 in which dielectric carrier 4 is nested inside.

Referring to FIGS. 1 and 5, wall mounting 1 is composed of a base mounting pan composed of a base plate 11 and a sidewall 12 extending around its entire periphery, the sidewall being integral with said base plate and perpendicular to it. Centered in base plate 11 is depression 13 and centered in depression 13 are sidewalls 5, forming jack housing 3. Within depression 13 and 33 (see FIG. 6) are two holes 14 and 15, hole 14 being generally rectangular in shape except for two laterally disposed slots 16 in each of two of its opposing sidewalls. Such slots are adapted to receive and do receive tongue members 6 and are in alignment and in communication with slots 8 in jack housing sidewalls 5. In one of the sidewalls forming hole 14 are a plurality of parallel grooves 17, which are adapted to receive a like number of spring contacts 9 of dielectric carrier 4. See also FIG. 9.

Spring contacts 9 are in electrical communication with insulated electrical conductors 18 through contact assembly 9'. Insulated electrical conductors 18 are, through terminal posts 19 (FIG. 6) and 21 (FIG. 5) in electrical communication with a drop wire 37 which is connected to a telephone transmission pair (not shown). Plug 28, as described below, is adapted to be fitted into the remaining portion of cavity 33 and through its spring contacts there is an electrical path completed by means of such contacts coming into mechanical and electrical contact with spring contacts 9 of dielectric electrical carrier 4, thus forming a telecommunications circuit with the telephone handset (not shown) adapted to be connected to wall base 2. See U.S. Pat. No. 3,990,764 for details.

Figure 4:
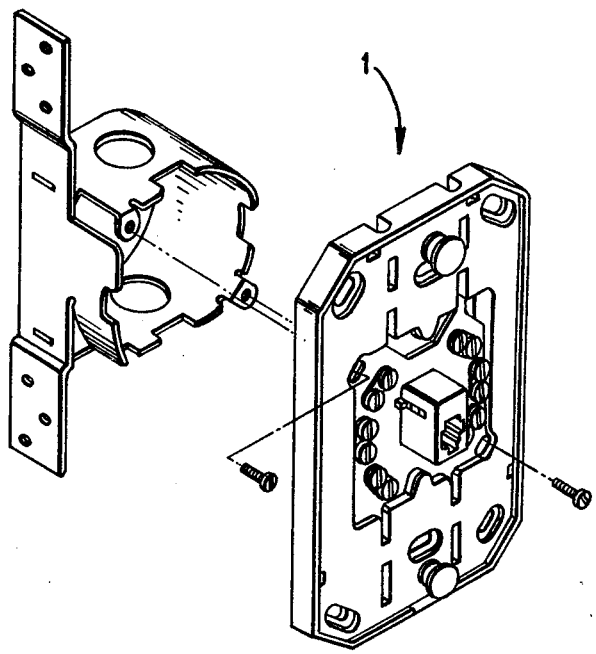

Wall mounting 1 is configured so that it can be fastened directly to a wall surface (see FIG. 2) or to a standard recessed electrical box (see FIG. 3) or to a standard recessed telephone box (FIG. 4). As a result, a jack can be connected to telephone transmission pair (not shown) via drop wire 37 either running along the surface of or concealed inside of a wall in a manner well known. Electrical connection between the drop wire 37 and electrical conductors 18 is achieved by merely connecting the drop wire 37 pair with the appropriate terminal 21.

Wall mounting 1 is completed by a face plate 22, adapted to fit inside of sidewall 12 and is attached to base plate 11 by fasteners 24, adapted to be removably fitted into aligned holes in base plate 11, shown in part by element 25. When face plate 22 is so attached, the forward end of jack housing 3 protrudes through hole 23 in it and a pair of nail head studs 26 straddle and are in vertical alignment with hole 23 and protrude through holes 26'.

Nail head like studs 26 are used to attach and secure telephone base mounting 2 to the wall mounting 1. Base mounting 2 consists of a base pan 27 and plug 28. Base pan 27 includes means 29 for securing it to the base of a telephone set and a pair of keyhole slots 30 that straddle and are in vertical alignment with rectangular opening 31, the sides of which are formed to provide rails 32. Keyhole slots 30 are spaced the same distance apart as the nail head studs 26 of the wall mounting 1, and the large portions of the slots are of a size to accommodate the heads of the studs 26, while the narrow upper portion of the slots are of the size to accommodate the shanks of the studs.

For details concerning the construction of plug 28 and telephone base mounting 2, and how the spring contacts of plug 28 coact with spring contacts 9, reference is expressly made to the description of same in U.S. Pat. No. 3,990,764. The plug itself and telephone base mounting forms no part of the instant invention.

When plug 28 is positioned at the bottom of opening 31 in base pan 27, the plug portion of plug 28 is able to move into the plug receiving portion of cavity 33 at the same time that the nail head studs 26 of the wall mounting 1 move into the enlarged lower portions of the keyhole slots 30 in the base pan 27. As the plug portion of plug 28 moves into the plug receiving cavity 33, the spring contacts thereof (not shown) electrically and mechanically engage the cantilever portions of the spring contacts and deflect them upwards as described in FIGS. 6 and 7 of the above mentioned patent.

Figure 6:
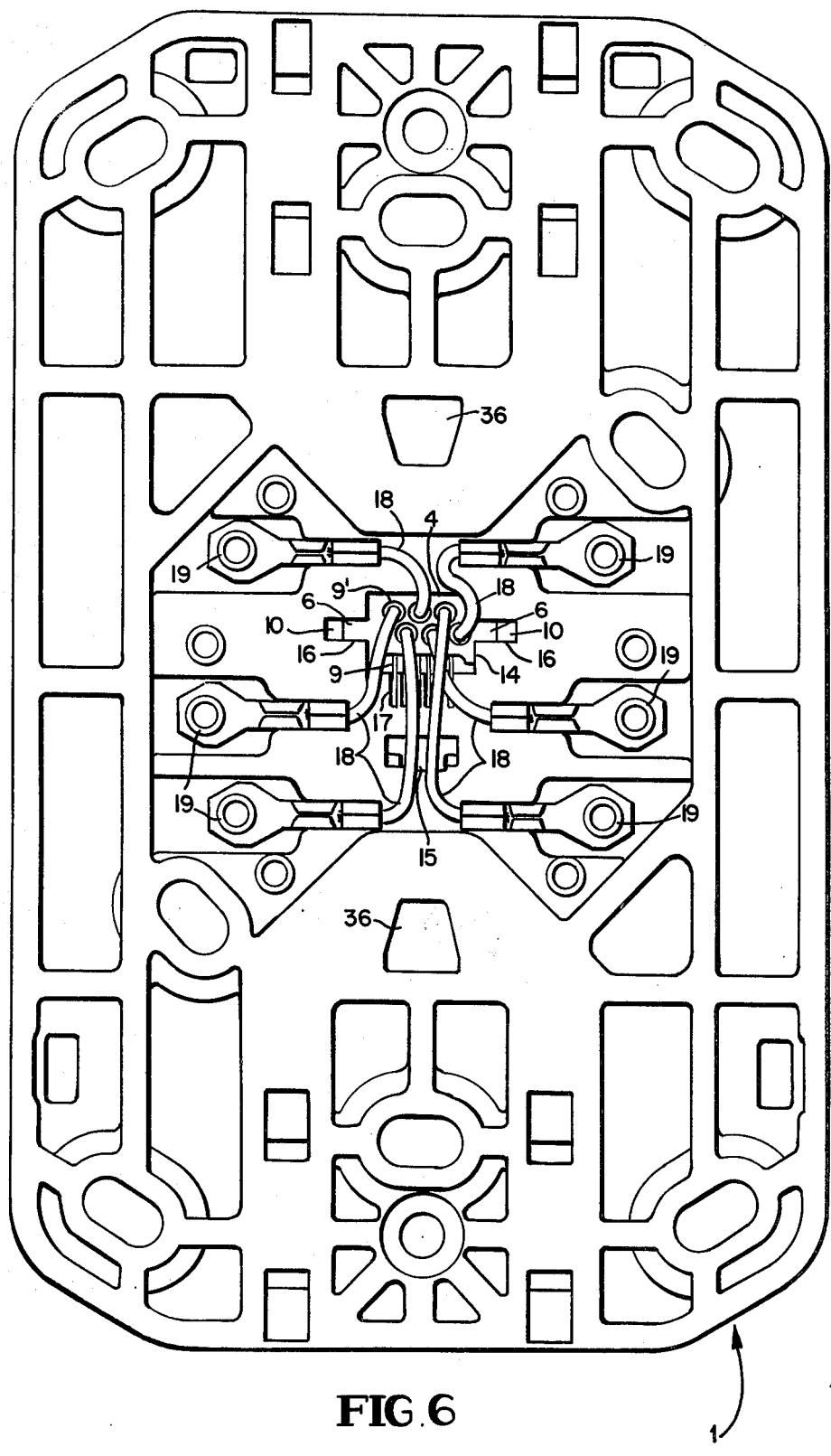
FIG. 6 is a plan view of the bottom side (wall interface side) of the wall mounting 1 with carrier dielectric 4 nested inside jack housing 3 and in electrical connection with terminals affixed to the wall mounting.
Figure 7:
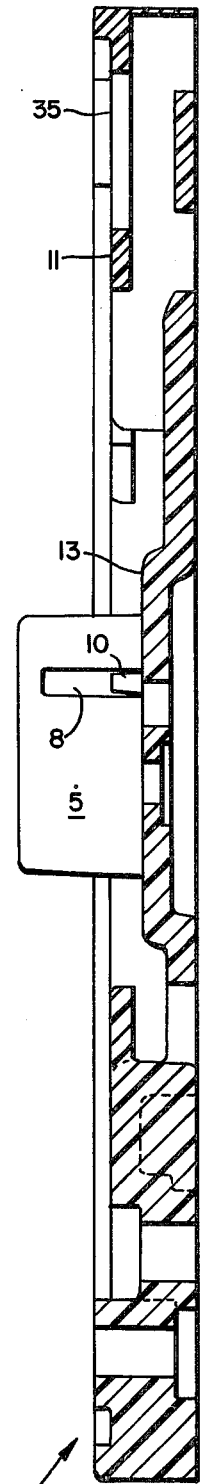
FIG. 7 is a cross section of wall mounting 1 along line 7—7 of FIG. 2.

FIG. 6 shows a plan view of the bottom surface of the wall mounting namely that surface which would interface with a wall. Shown by element 33 is a configurated depression located in the center of wall mounting 1 and essentially surrounding holes 14 and 15. Deposed around hole 14 and in depression 33 is a plurality of terminal means 19 which are in electrical communication with the insulated electrical conductors 18 of the unitary dielectric carrier 4, which are in turn in electrical communication with spring contacts 9. See FIG. 10. Depression 33 has lateral and vertical dimensions so as to accommodate lengths of insulated electrical conductors, the storage of which might otherwise cause an uneven contact between the bottom surface of wall mounting 1 with the wall surface. In like manner, depression 13, on reverse side of the wall mounting 1, is of such a nature—transverse and lateral dimensions—so as to accommodate lengths of like insulated electrical conductors coming into the wall mounting from the outside through holes 34 and channels 35 for connection to terminals 21.

In depression 13, there are two holes shown by element 36. Such holes are essentially covered by protrusions 37 and are spaced apart from the terminal edges of and extending out over the holes in a cantilevered fashion. Telephone transmission pair in the nature of drop wire 37 connected to a main transmission telephone pair (not shown) is provided entrance into a cavity created by depression 13 through slots 34 and are electrically terminated at terminals 21. They also may be brought in through slots 34, down through channels 35 and likewise terminated. Protrusions 37 are used to "dress up" the incoming electrical conductors and keep them in neatly bunched arrangement of a predetermined nature.

It is to be undestood that the embodiments described herein is merely illustrative of the principles of the invention. Various modifications may be made thereto by persons skilled in the art without departing from the spirit and scope of the invention.

What is claimed is:

1. A telephone wall mounting comprising:
   (a) base plate having at least one hole therein, said hole being rectangular in shape and having first and second opposing sidewalls each containing a slot therein, and a third sidewall containing a plurality of parallel grooves adapted to receive a like number of spring contacts;
   (b) at least two nail head like studs each having a shank portion, one terminal portion being integrally connected to a nail head like portion and the other terminal portion being in mechanical connection with the surface of said base plate;
   (c) a rectangular shaped jack housing circumscribing said hole composed of sidewalls integrally connected to and extending perpendicular from said base plate above said nail head like portion, two opposing sidewalls of said jack housing each containing a slot therein extending vertically from said base plate and in alignment with the first mentioned slots;
   (d) a protrusion integral with said base plate vertically extending therefrom in alignment with and adjacent to both mentioned slots.

2. A wall mounting as described in claim 1 in combination with a unitary dielectric contact carrier composed of a rectangular shaped dielectric body in which a plurality of metallic spring contacts are embedded and are in electrical communication with a like number of insulated electrical conductors, said rectangular body of said carrier having laterally extending tongues on two of its opposing sidewalls received in said first and second mentioned slots and said spring contacts disposed in said plurality of parallel grooves.

3. A telephone wall mounting as described in claim 2 wherein said base plate contains a shaped depression located essentially in the center thereof and surrounding said hole, said shaped depression containing a plurality of terminal means fixedly attached thereto adapted to make electrical connection between said insulated electrical conductors of said unitary dielectric contact carrier and a telephone transmission pair.

4. A telephone wall mounting as described in claim 1 wherein said base plate contains a sidewall integrally connected thereto and extending vertically from and around its periphery.

5. A telephone wall mounting as described in claim 4 containing a face plate coextensive with and removably attached to said base plate, said face place having three holes therein, two of which are in alignment with said nail head like studs to permit passage of said studs there through and the remaining hole essentially in the center thereof and in alignment with and receiving said jack housing.

6. A telephone wall mounting as described in claim 2 wherein the tongues of said unitary dielectric carrier contain a raised portion thereon forming a shoulder which is in locking contact with said protrusions extending from the base plate.

* * * * *